United States Patent Office 3,441,550
Patented Apr. 29, 1969

3,441,550
TETRAKIS $NF_2$ ADDUCT OF DIVINYLCARBINOL AND ACRYLATE AND POLYMER THEREOF
Abraham A. Zimmerman, New York, N.Y., assignor to Esso Research and Engineering Company, a corporation of Delaware
No Drawing. Filed Sept. 11, 1962, Ser. No. 224,886
Int. Cl. C08f *3/64;* C07c *135/00, 87/26*
U.S. Cl. 260—89.5                                      9 Claims This invention relates particularly to the synthesis and polymerization of 3-(1,2,4,5-tetrakis-($NF_2$)-pentyl) acrylate which forms a polymer of suitable characteristics for use as a binder in a high-energy solid rocket propellant.

An objective is to develop a polyacrylate which contain a high $NF_2$ content, and a difficulty in achieving this objective has been the preparation of suitable monomeric components.

In accordance with the present invention, it has now been found that the unsaturated alcohol divinylcarbinol, or 1,4-pentadiene-3-ol, having the formula $$CH_2{:}CH{\cdot}CH(OH){\cdot}CH{:}CH_2$$

can be reacted under suitable conditions to prepare a high $NF_2$ content alcohol that is satisfactorily esterified to form a polymerizable acrylate useful for polymerization to form a desired clear, tough resin of high $NF_2$ content.

The reaction of divinylicarbinol with $N_2F_4$ can be carried out satisfactorily under superatmospheric pressure in the range of about 100 to 500 p.s.i. at programmed temperatures in the range of 50° to 150° C., and at a maximum in the range of 120° to 150° C., using a glass reactor or a stainless steel reactor. In using a glass reactor, the reactor is preconditioned by treatment with HF and the reaction is preferably run using an NaF buffer in the amount of 5 to 10% by weight of the carbinol.

In some of the first attempts to form the tetrakis $NF_2$ adduct of divinylcarbinol, there was an observation that at lower reaction temperatures in the range of 50° to 100° C., the product obtained was mainly the bis $NF_2$ adduct. In using more drastic conditions involving reaction temperatures up as high as about 200° C., there was some loss of fluorine.

The following example demonstrates a preferred method of obtaining the tetrakis $NF_2$ divinylcarbinol adduct particularly suitable for esterification with acid or acrylic chloride to obtain a polymerizable acrylate represented by the following formula:

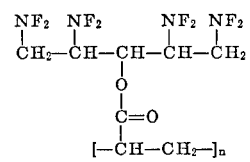

Example

Divinylcarbinol (10% solution in $CHCl_3$) is reacted with excess $N_2F_4$ for saturating the double bonds under a pressure in the range of 200 to 500 p.s.i. at a programmed reaction temperature at 50° C. for 1 hr., 100° C. for 1 hr., and with a final temperature ranging principally from 120° C. to about 140° C. for a final reaction period of 2 to 3 hours. The crude product obtained was found to contain from 50 to 75 wt. percent of the tetrakis $NF_2$ adduct of the divinylcarbinol. This crude product is reacted with excess acrylyl chloride using zinc chloride as the esterification catalyst at a temperature in the range of 30° to 80° C. under a reduced pressure of about 100 mm. Hg absolute for a period in the range of 30 minutes to 2 hours to form the 3-(1,2,4,5-tetrakis-($NF_2$)-pentyl) acrylate having a structural formula as indicated.

The acrylate can be purified by short-path vacuum distillation. Column chromatography on silica gel, with the use of $CHCl_3$ or similar solvent for elution, or gas chromatography can also be used for isolation of the substantially pure product having a composition corresponding to the theoretical composition for the structural formula given, i.e. $C_8H_{10}O_2N_4F_8$.

The tetrakis $NF_2$ pentyl acrylate is polymerized with an organic peroxide catalyst, such as benzoyl peroxide, (0.1 to 10 wt. percent of catalyst) at a moderate temperature of about 80° C., or in the range of 25° to 85° C., to obtain a rubbery solid in several hours. The rubbery solid, on further heating for 20 to 25 hours, yields a clear, tough resin of 60% $NF_2$ content, and this resin is useful as a binder in a solid rocket propellant composite, as shown by its physical characteristics and high-energy product. The composition and structure assigned to the linear acrylate polymer obtained is:

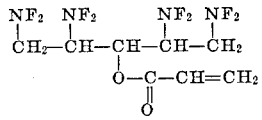

wherein the subscription *n,* in the usual manner, indicates the number of recurring monomeric units in the linear polymer chain. This acrylate polymer is indicated to have molecular weights in the range of 2,000 to 40,000 and higher. Polymers thus obtained have substantial solubility in acetone.

In the preparation of the tetrakis $NF_2$ adduct of divinylcarbinol, modifications may be made. For example, other halogenated aliphatic hydrocarbons may be used as the solvent or diluent for the divinylcarbinol, e.g.

$$Cl_2(F)CC(Cl)F_2$$

In forming the polymers, a low molecular weight prepolymer of viscous liquid consistency may be formed for compositing with powdered metal fuels of high energy and solid and liquid oxidizers of high energy to further polymerization during casting of the propellant grain. If desired, the polymer composite can be put into a solution with acetone as the solvent, or a similar liquid solvent, for compositing.

High specific impulse composites are obtained with the polyacrylate binder made in accordance with the present invention using this polymer in a proportion of about 5 to 20 wt. percent with about 2 to 10 wt. percent of a powdered metal fuel, such as boron, beryllium, aluminum or lithium, and using suitable proportions of solid oxygen-containing oxidizers, such as nitrates, perchlorates, or polynitro compounds, and liquid $NF_2$ compounds, such as tetrakis $NF_2$ butane, that serve as oxidizers and plasticizers.

The invention described is claimed as follows:

1. Tetrakis $NF_2$ adduct of divinylcarbinol.
2. Acrylate of tetrakis $NF_2$ adduct of divinylcarbinol represented by the formula:

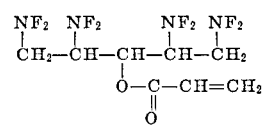

3. Polymer of 3-(1,2,4,5-tetrakis-($NF_2$)-pentyl) acrylate.
4. Method of synthesizing tetrakis $NF_2$ adduct of divinylcarbinol, which comprises reacting divinylcarbinol dissolved in a halogenated aliphatic hydrocarbon solvent with excess $N_2F_4$ under pressure at a programmed temperature to a maximum of 120° to 150° C. to obtain a product having 50 to 75 wt. percent of tetrakis $NF_2$ adduct of the divinylcarbinol.

5. Method of forming 3-(1,2,4,5-tetrakis-($NF_2$)-pentyl) acrylate, which comprises reacting tetrakis $NF_2$ adduct of divinylcarbinol with acrylyl chloride in the presence of a catalyst at 30° to 80° C. under reduced pressure for about 30 minutes to 2 hours and recovering as resulting product a crude acrylate having the composition $C_8H_{10}O_2N_4F_8$, and separating said resulting product.

6. Process for preparing a high-energy polyacrylate, which comprises treating 3-(1,2,4,5-tetrakis-($NF_2$)-pentyl) acrylate in with an organic peroxide catalyst until the acrylate monomer is polymerized to a solid.

7. Process for preparing a high-energy polyacrylate suitable as a solid rocket propellant, which comprises: (a) synthesizing tetrakis $NF_2$ adduct of divinylcarbinol by reacting divinylcarbinol with $N_2F_4$; (b) reacting said tetrakis $NF_2$ adduct of divinylcarbinol with acrylyl chloride as an acrylic esterification reactant to form an acrylate of said tetrakis $NF_2$ adduct of divinylcarbinol; (c) polymerizing said acrylate.

8. Process of claim 7, wherein the acrylate has the formula:

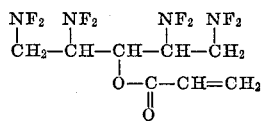

and the acrylate is polymerized to a polymer characterized by the recurring unit:

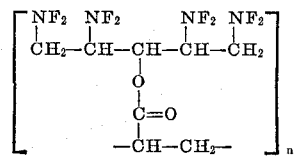

wherein the subscript $n$ indicates the number of recurring units to give the polymer a molecular weight in the range of 2,000 to about 40,000.

9. Process of claim 7, wherein the acrylate polymer is heated to obtain a clear, tough resin to rubbery solid.

References Cited

Hoffman et al.: Chemical Reviews, vol. 62, pp. 12 to 18 (1962).

LELAND A. SEBASTIAN, *Primary Examiner.*

U.S. Cl. X.R.

149—19, 20, 22, 44; 260—486, 584